June 17, 1930.  L. SCHERZ  1,765,100
DIRECTION SIGNAL FOR MOTOR VEHICLES
Filed Jan. 18, 1927  3 Sheets-Sheet 1
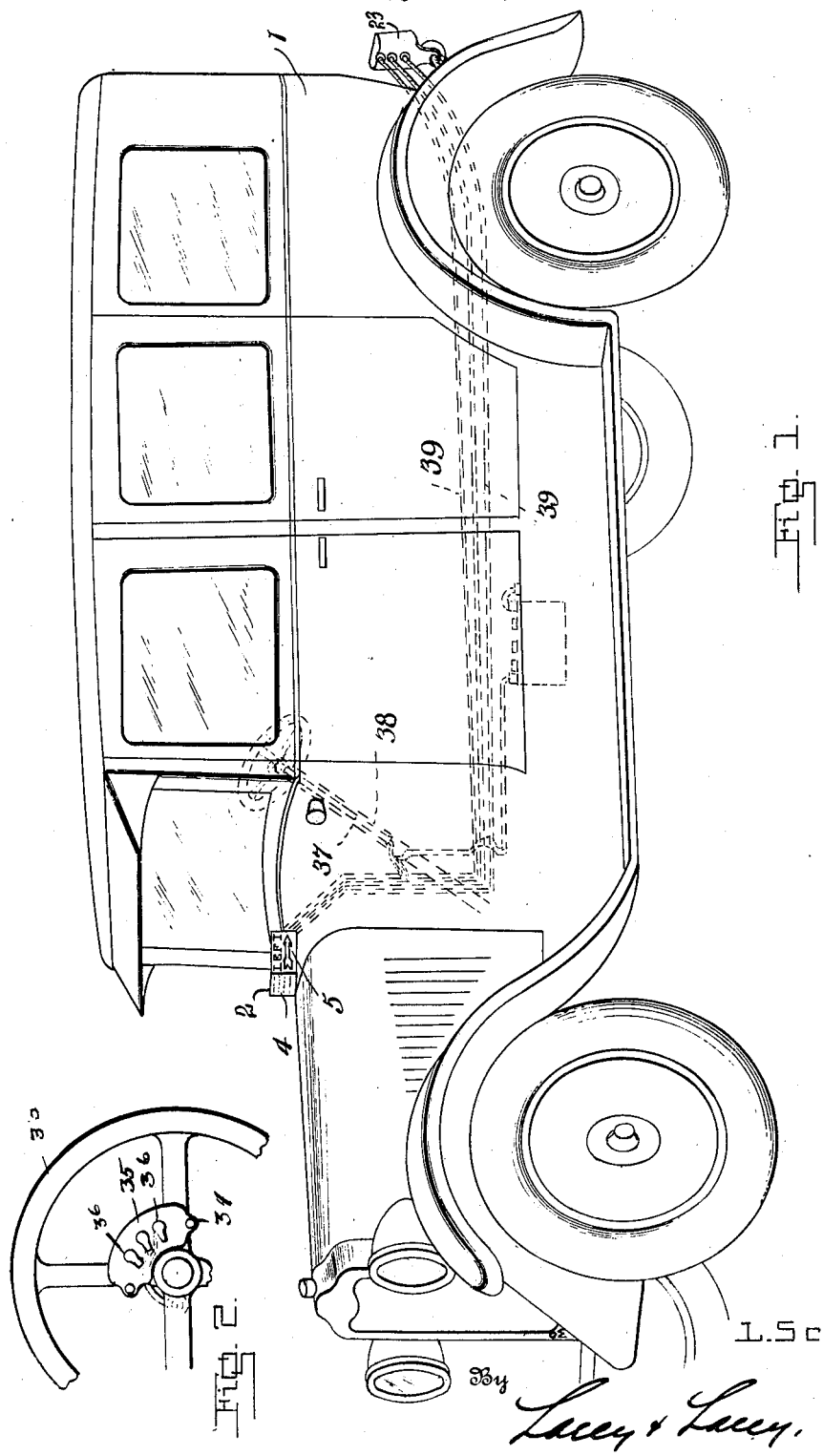
Inventor
L. Scherz
By Lacey & Lacey, Attorneys June 17, 1930. L. SCHERZ 1,765,100
DIRECTION SIGNAL FOR MOTOR VEHICLES
Filed Jan. 18, 1927  3 Sheets-Sheet 2
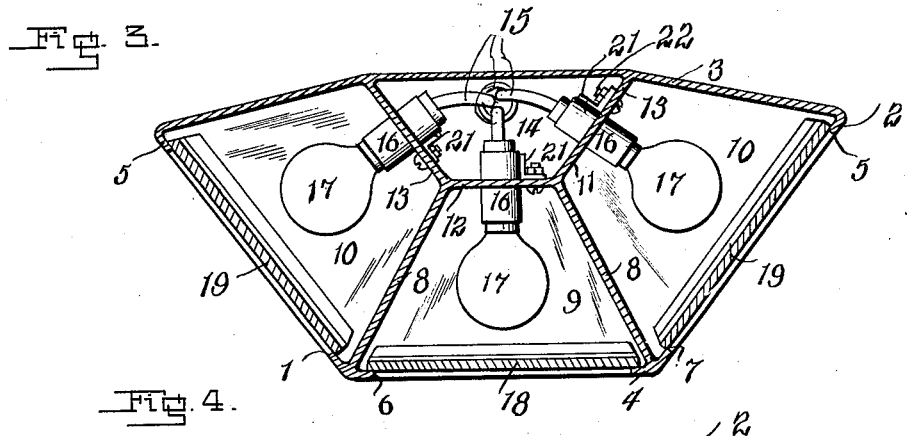
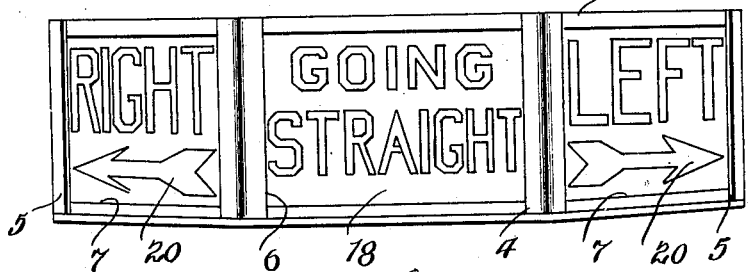
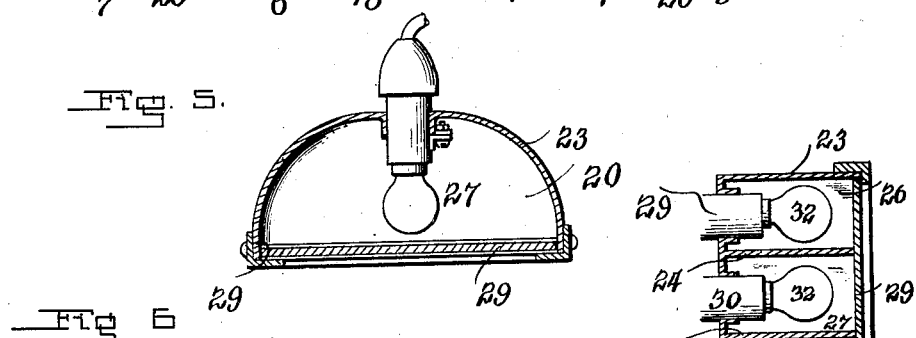
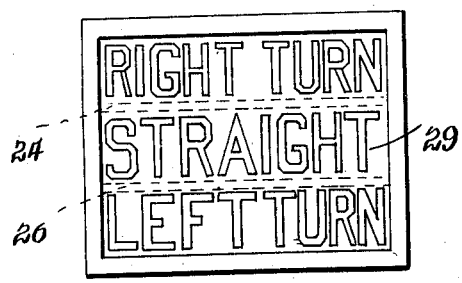
Inventor
L. Scherz
By Lacey & Lacey, Attorneys

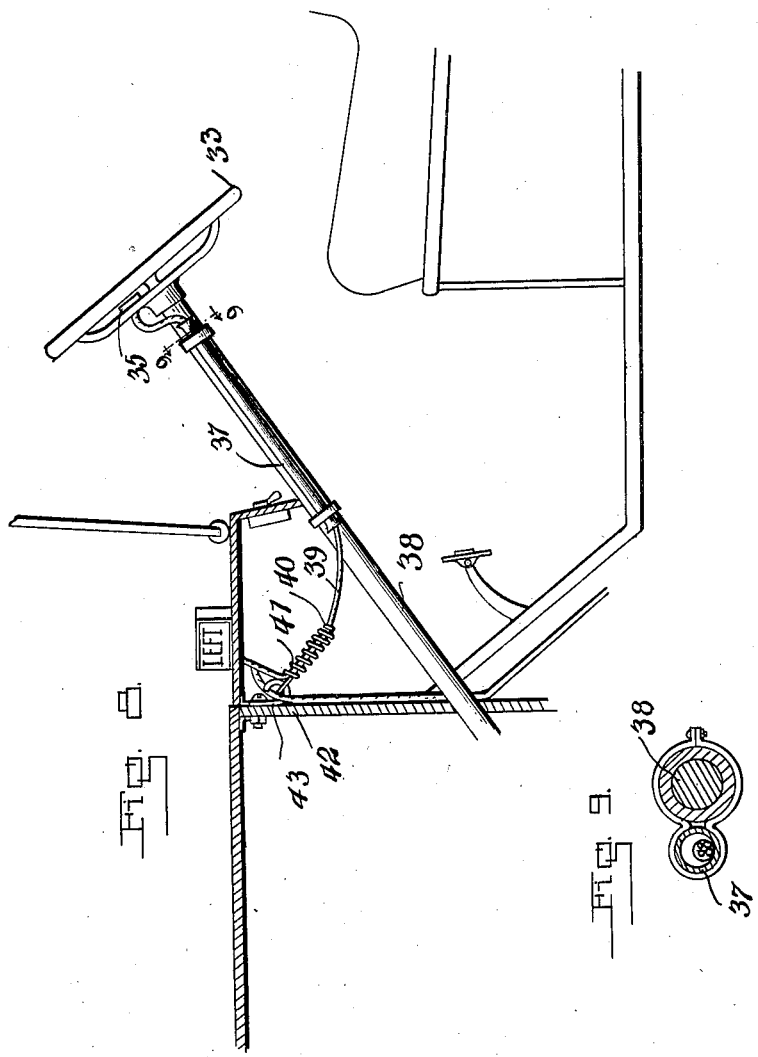

Patented June 17, 1930

1,765,100

UNITED STATES PATENT OFFICE

LOUIS SCHERZ, OF WILKES-BARRE, PENNSYLVANIA

DIRECTION SIGNAL FOR MOTOR VEHICLES

Application filed January 18, 1927. Serial No. 161,822.

The present invention is directed to improvements in direction signals for motor vehicles of the closed type.

The primary object of the invention is to provide a device of this character comprising a pair of signal units, one upon the front and the other upon the rear of the vehicle and capable of being illuminated in order that drivers of cars either approaching or following will be notified as to the intended course the vehicle so equipped is about to take.

Another object of the invention is to provide a signal of this nature so constructed that the proper signal of the respective signal units will be illuminated simultaneously upon the operation of the selected switch upon the steering wheel of the vehicle and consequently conveniently located for manipulation.

Another object of the invention is to provide a signal of this character wherein the front signal unit is so constructed that a signal will be readily discernable from either side of the vehicle in order that drivers approaching from either side will be cognizant of the intended course of the car so equipped.

In the accompanying drawings:

Figure 1 is a perspective view of a vehicle, showing the signal thereon.

Figure 2 is a fragmentary plan view of the steering wheel showing the switch box thereon.

Figure 3 is a horizontal sectional view through the front signal casing.

Figure 4 is a front view thereof.

Figure 5 is a horizontal sectional view through the rear casing.

Figure 6 is a rear view thereof.

Figure 7 is a vertical sectional view through the rear casing.

Figure 8 is a detail sectional view showing the spring connection for the conducting wires.

Figure 9 is a sectional view on line 9—9 of Figure 8.

Referring to the drawings, 1 designates a vehicle of the closed type and with which the signal is specially adaptable owing to the fact that when the window adjacent the driver's seat is closed, the driver is unable to conveniently signal by hand.

Suitably mounted upon the front of the vehicle, preferably upon the cowl thereof, is a casing 2, comprising a rear wall 3, front wall 4, and angularly disposed side walls 5, said walls being provided, respectively, with openings 6 and 7.

Vertically disposed within the casing 2 are partitions 8—8 divergingly disposed with respect to each other and with the rear wall 3 in order to provide a central compartment 9 and side compartments 10. These compartments are closed at their rear ends by a partition 11, the section 12 thereof closing the rear ends of the compartment 9 while the sections 13 close the rear ends of the compartments 10 as clearly illustrated in Figure 3 of the drawings. The sections 12 and 13 are angularly disposed and in conjunction with the rear wall 3 provide a chamber 14 for the reception of the circuit wires 15 which have their terminals secured in the sockets 16, said sockets being supported, respectively, in the partitions 12 and 13. These sockets bear incandescent lamps 17 which occupy the compartments 9 and 10—10.

The openings 6 and 7 are closed by lenses 18 and 19, respectively, preferably colored red, the front lens 18 bearing the indicia "Going straight", while the lenses of the side openings bear respectively the words "Right" and "Left", and have associated therewith the representation of an arrow 20. These lenses may be secured in their respective openings in any approved manner.

In order that the sockets 16 may be interchanged, each socket has fixed thereto an angular bracket 21 retained in fixed relationship with its associated partition by a bolt 22.

Suitably mounted, preferably upon the left hand rear fender is the rear signal casing 23 having horizontal partitions 24 and 25 dividing said casing into compartments 26, 27 and 28, a lens 29 closing the open end 29' thereof.

The lens 29 is preferably colored red and has marked thereon the indicia "Right turn", "Straight", and "Left turn", which coincide, respectively with the compartments 26, 27 and 28, the rear wall of said casing supporting sockets 29, 30 and 31, which extend into the respective compartments and support lamps 32 to selectively illuminate the respective compartments.

Retained on the steering wheel 33 by brackets 34 is a box 35 having controlling switches 36, there being a tube 37 adapted to lie along the steering column 38 and through which the circuit wires 39 are engaged, said circuit wires having connection with the terminals 15. These wires are so arranged that when a selected switch is operated individual lamps in the compartments of the casing 2 and 23 will be illuminated.

It will be obvious that when driver intends to turn to the left a switch is operated to simultaneously illuminate the lamp 17 in the left-hand compartment 10 of the casing 2 and the lamp 32 in the compartment 28 of the casing 23, thereby notifying a following driver that a left hand turn is intended to be made, while a driver approaching the vehicle will also know the intended course due to the illumination of the lens 19 bearing the indicia "Left". It will be obvious that when a straight course is intended that the rear signal will display the indicia "Straight" and the front signal will display the indicia "Going straight". If a right hand turn is intended, the indicia "Right turn" on the rear signal casing will be displayed as well as the signal "Right" of the front signal. In this manner of the car equipped with the signals, can upon selectively operating a switch indicate to approaching and following drivers the course intended to be taken, and while the signal is more effective at night, the same will be illuminated with sufficient brilliance to be used successfully in the daytime.

Upon reference to Figure 8 it will be observed that the circuit wires 39 are secured, as at 40, to the inner terminal of the coil spring 41 and pass through the spring and are led to the signal unit as shown in Figure 1. The outer terminal of the spring 41 is secured to the dash board 42 by a clamp 43. Thus, when the steering wheel 33 is turned sharply, the wires 39 will be pulled upward through the tube 37, thus expanding the spring to retain the wires taut. As soon as the wheel is straightened up the spring during its contraction will draw the wires 39 downwardly, thus preventing the ends adjacent the switch box 35 from becoming tangled.

Having thus described the invention, I claim:

In a signal, a casing comprising a rear wall, a front wall having an intermediate portion and side portions extending diagonally from its intermediate portion to ends of its rear wall and formed with openings, lenses closing the openings in the intermediate and side portions of said front wall, partitions in said casing extending rearwardly from intersections of the said portions of the front wall and converging rearwardly and dividing the casing into an intermediate chamber and side chambers, said partitions terminating in spaced relation to the rear wall, a partition having an intermediate portion joining the rear ends of the first-mentioned partitions and end portions diverging rearwardly and joined to the rear wall, the intermediate and end portions of the last-mentioned partitions forming rear walls for said chambers and together with the intermediate portion of the rear wall forming a rear compartment in the casing, and lamp sockets extending through the rear walls of the intermediate and side chambers to support lamps therein and each having its rear portion projecting into the rear chamber and removably secured to the wall through which it passes.

In testimony whereof I affix my signature.

LOUIS SCHERZ. [L. S.]